United States Patent

Miguelino

[11] Patent Number: 5,928,542
[45] Date of Patent: Jul. 27, 1999

[54] SOLAR POWER BEVERAGE WARMER

[76] Inventor: Florante M. Miguelino, 651 Cypress Ave., Sunnyvale, Calif. 94086-3827

[21] Appl. No.: 09/048,425

[22] Filed: Mar. 26, 1998

[51] Int. Cl.[6] .............................. H01L 31/58; H02N 6/00; H05B 3/02

[52] U.S. Cl. ......................... 219/432; 219/201; 219/436; 136/291

[58] Field of Search ..................................... 219/432, 436, 219/438, 200, 201; 362/183; 136/291, 243, 244, 252

[56] References Cited

U.S. PATENT DOCUMENTS

| | | | |
|---|---|---|---|
| 4,095,090 | 6/1978 | Pianezza | 219/438 |
| 4,442,343 | 4/1984 | Genuit et al. | 219/432 |
| 4,523,083 | 6/1985 | Hamilton | 219/432 |
| 4,648,013 | 3/1987 | Curiel | 362/183 |
| 4,980,539 | 12/1990 | Walton | 219/432 |
| 5,062,028 | 10/1991 | Frost et al. | 362/183 |
| 5,072,095 | 12/1991 | Hoffmann | 219/432 |
| 5,283,420 | 2/1994 | Montalto | 219/432 |
| 5,369,255 | 11/1994 | Sherer et al. | 219/725 |

FOREIGN PATENT DOCUMENTS 2596503  10/1987  France .

*Primary Examiner*—Joseph Pelham

[57] ABSTRACT

A new solar power beverage warmer for heating a beverage contained therein. The inventive device includes a container having a bottom and a perimeter side wall. The inner surface of the container defines a reservoir adapted for holding a liquid and a heating element is provided on the inner surface of the container to heat liquids in the reservoir. The device also includes a base having a plurality of photovoltaic cells. The base has a recess adapted for receiving the bottom of the container therein so that the container is electrically connectable to the photovoltaic cells of the base when the container is inserted into the recess.

11 Claims, 2 Drawing Sheets

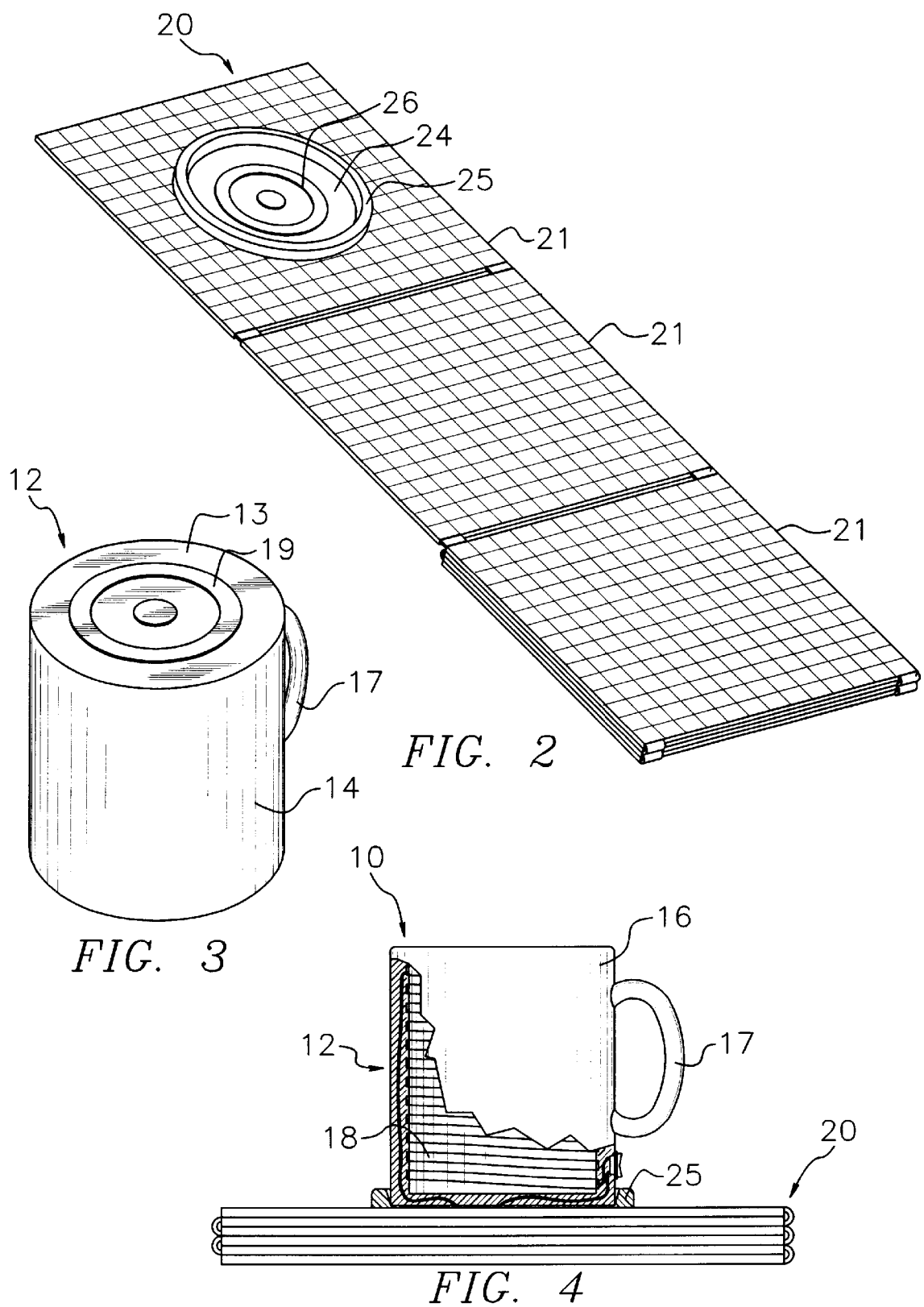

SOLAR POWER BEVERAGE WARMER

BACKGROUND OF THE INVENTION

1. Field of the Invention

The present invention relates to beverage warmers and more particularly pertains to a new solar power beverage warmer for heating a beverage contained therein.

2. Description of the Prior Art

The use of beverage warmers is known in the prior art. More specifically, beverage warmers heretofore devised and utilized are known to consist basically of familiar, expected and obvious structural configurations, notwithstanding the myriad of designs encompassed by the crowded prior art which have been developed for the fulfillment of countless objectives and requirements.

Known prior art beverage warmers include U.S. Pat. No. 4,801,782; U.S. Pat. No. 4,983,798; U.S. Pat. No. Des. 312,747; U.S. Pat. No. 4,356,381; U.S. Pat. No. 5,073,699; and U.S. Pat. No. 4,479,488.

While these devices fulfill their respective, particular objectives and requirements, the aforementioned patents do not disclose a new solar power beverage warmer. The inventive device includes a container having a bottom and a perimeter side wall. The inner surface of the container defines a reservoir adapted for holding a liquid and a heating element is provided on the inner surface of the container to heat liquids in the reservoir. The device also includes a base having a plurality of photovoltaic cells. The base has a recess adapted for receiving the bottom of the container therein so that the container is electrically connectable to the photovoltaic cells of the base when the container is inserted into the recess.

In these respects, the solar power beverage warmer according to the present invention substantially departs from the conventional concepts and designs of the prior art, and in so doing provides an apparatus primarily developed for the purpose of heating a beverage contained therein.

SUMMARY OF THE INVENTION

In view of the foregoing disadvantages inherent in the known types of beverage warmers now present in the prior art, the present invention provides a new solar power beverage warmer construction wherein the same can be utilized for heating a beverage contained therein.

The general purpose of the present invention, which will be described subsequently in greater detail, is to provide a new solar power beverage warmer apparatus and method which has many of the advantages of the beverage warmers mentioned heretofore and many novel features that result in a new solar power beverage warmer which is not anticipated, rendered obvious, suggested, or even implied by any of the prior art beverage warmers, either alone or in any combination thereof.

To attain this, the present invention generally comprises a container having a bottom and a perimeter side wall. The inner surface of the container defines a reservoir adapted for holding a liquid and a heating element is provided on the inner surface of the container to heat liquids in the reservoir. The device also includes a base having a plurality of photovoltaic cells. The base has a recess adapted for receiving the bottom of the container therein so that the container is electrically connectable to the photovoltaic cells of the base when the container is inserted into the recess.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new solar power beverage warmer apparatus and method which has many of the advantages of the beverage warmers mentioned heretofore and many novel features that result in a new solar power beverage warmer which is not anticipated, rendered obvious, suggested, or even implied by any of the prior art beverage warmers, either alone or in any combination thereof.

It is another object of the present invention to provide a new solar power beverage warmer which may be easily and efficiently manufactured and marketed.

It is a further object of the present invention to provide a new solar power beverage warmer which is of a durable and reliable construction.

An even further object of the present invention is to provide a new solar power beverage warmer which is susceptible of a low cost of manufacture with regard to both materials and labor, and which accordingly is then susceptible of low prices of sale to the consuming public, thereby making such solar power beverage warmer economically available to the buying public.

Still yet another object of the present invention is to provide a new solar power beverage warmer which provides in the apparatuses and methods of the prior art some of the advantages thereof, while simultaneously overcoming some of the disadvantages normally associated therewith.

Still another object of the present invention is to provide a new solar power beverage warmer for heating a beverage contained therein.

Yet another object of the present invention is to provide a new solar power beverage warmer which includes a container having a bottom and a perimeter side wall. The inner surface of the container defines a reservoir adapted for holding a liquid and a heating element is provided on the inner surface of the container to heat liquids in the reservoir. The device also includes a base having a plurality of photovoltaic cells. The base has a recess adapted for receiving the bottom of the container therein so that the container is electrically connectable to the photovoltaic cells of the base when the container is inserted into the recess.

Still yet another object of the present invention is to provide a new solar power beverage warmer that also helps maintain the heated of an already heated beverage.

Even still another object of the present invention is to provide a new solar power beverage warmer that is easily portable and able to be used outdoors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic perspective view of the base of the present invention with some of the panels unfolded from the stack of panels.

FIG. 3 is a schematic perspective view of the bottom of the container of the present invention.

FIG. 4 is a schematic breakaway sectional view of the present invention.

DESCRIPTION OF THE PREFERRED EMBODIMENT

Figure 1:
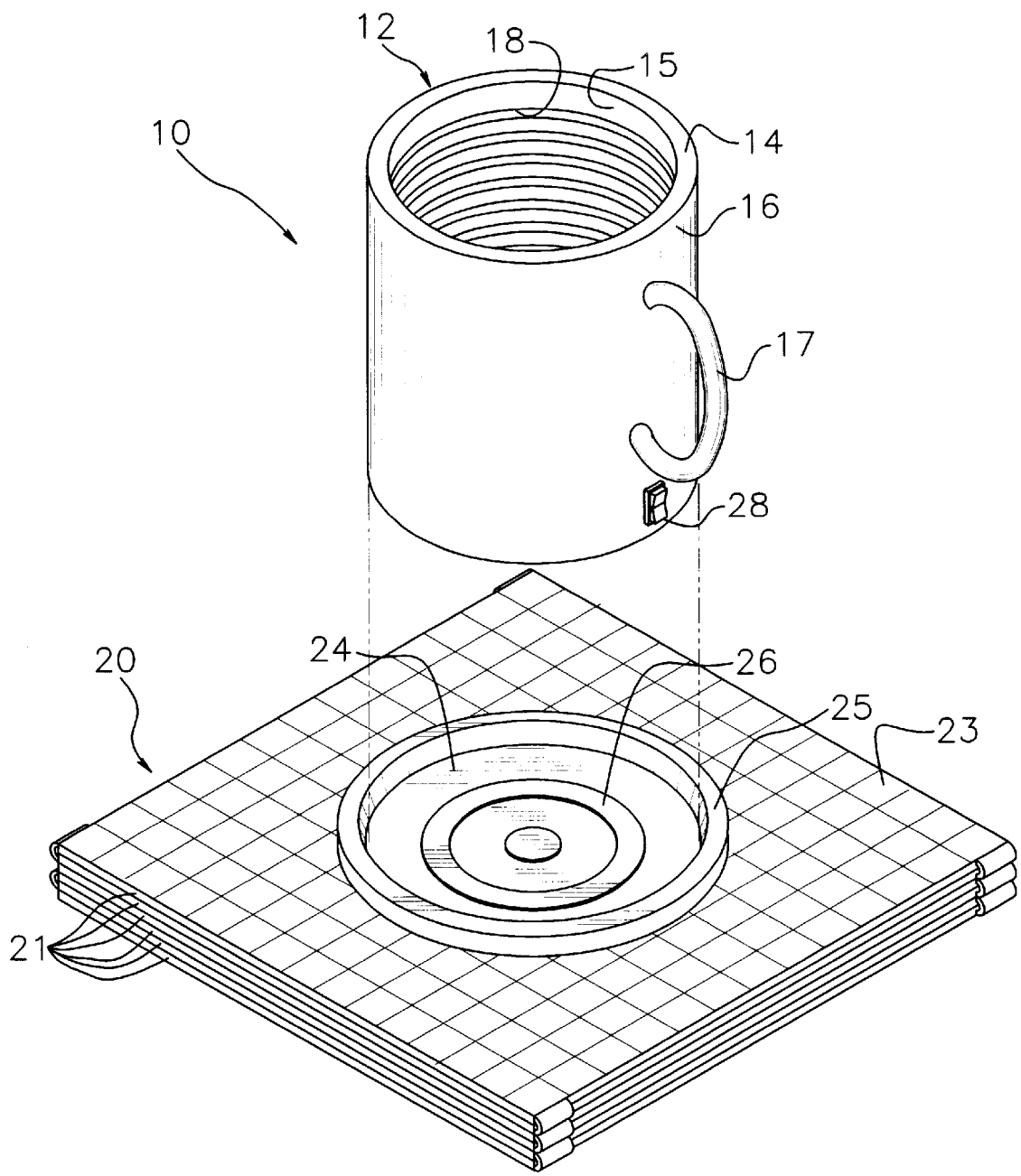
FIG. 1 is a schematic perspective view of a new solar power beverage warmer with the panels of the base folded into a stack according to the present invention.

With reference now to the drawings, and in particular to FIGS. 1 through 4 thereof, a new solar power beverage warmer embodying the principles and concepts of the present invention and generally designated by the reference numeral 10 will be described.

As best illustrated in FIGS. 1 through 4, the solar power beverage warmer 10 generally comprises a container 12 having a bottom 13 and a perimeter side wall 14. The inner surface 15 of the container 12 defines a reservoir adapted for holding a liquid and a heating element 18 is provided on the inner surface 15 of the container 12 to heat liquids in the reservoir. The device also includes a base 20 having a plurality of photovoltaic cells 23. The base 20 has a recess 24 adapted for receiving the bottom 13 of the container 12 therein so that the container 12 is electrically connectable to the photovoltaic cells 23 of the base 20 when the container 12 is inserted into the recess 24.

In closer detail, the container 12 is designed for holding a liquid. The container 12 has inner and outer surfaces 15,16, a bottom 13, and a perimeter side wall 14 extending upwards around the bottom 13. Preferably, the container is generally cylindrical with the bottom 13 of the container 12 being generally circular. The inner surface 15 of the container 12 defines a reservoir for holding a liquid therein while the perimeter side wall 14 defines an upper opening into the reservoir. In the preferred embodiment, the outer surface 16 of the container 12 has a handle 17 outwardly extending from the perimeter side wall 14 of the container 12. As illustrated in FIGS. 1 and 4, the elongate heating element 18 is provided on the inner surface 15 of the container 12. The heating element 18 is designed for providing heat to heat the reservoir of the container 12 when energized. The heating element 18 is preferably located on the perimeter side wall 14 of the container 12. Ideally, the heating element 18 is arranged in a coil extending around the perimeter side wall 14 of the container 12.

With reference to FIG. 2, the base 20 has a plurality of preferably rectangular panels 21. Each panel has first and second surfaces, a pair of ends and a pair of sides. The panels 21 also includes a plurality of photovoltaic cells 23 on both their first and second surfaces. The photovoltaic cells 23 of each panel 21 are designed for converting light energy into electrical energy and are preferably electrically connected to the photovoltaic cells of on other panels. In an ideal illustrative embodiment, the panels are generally square and have a length of less than about 5 inches for each of their ends and sides. As illustrated in FIG. 2, the panels 21 of the base 20 are preferably arranged side to side in an elongate row with first and second end panels 22,27. As shown in FIGS. 1 and 4, each panel 21 is hingedly coupled to the adjacent panels such that the panels 21 are foldable accordion fashion into a stack of panels with the first end panel 22 positioned at one end at the top of the stack of panels and the second end panel 27 positioned at another end of the stack of panels 21.

The first surface of the first end panel 22 of the base 20 has recess 24 therein. The recess 24 is preferably generally circular and is designed for receiving the bottom 13 of the container 12 therein as shown in FIG. 4. In the preferred embodiment, the first surface of the first end panel 22 of the base 20 has an annular lip 25 extending around the recess 24. The annular lip 25 is designed helping hold the container 12 in the recess 24.

As shown in FIGS. 1 and 2, a base contact 26 is provided in the recess 24. The base contact 26 is electrically connected to the photovoltaic cells 23 of the panels 21 of the base 20. Similarly, a container contact 19 is provided on the outer surface 16 of the container 12 and positioned on the bottom 13 of the container 12. The container contact 19 is electrically coupled to the heating element 18 of the container 12 by wires. The container contact 19 is electrically connectable to the base contact 26 when the bottom 13 of the container 12 is inserted into the recess 24 of the base 20 such that the heating element 18 is energized by the photovoltaic cells 23 of the panels 21 of the base 20. Ideally, a switch 28 with an actuator provided on the outer surface 16 of the container 12 is electrically coupled to the heating element 18 so that the switch 28 permits selective energization of the heating element 18.

In use, the reservoir of the container is filled with a liquid. The panels of base are unfolded so that the recess faces upwards. The container is inserted into the recess so that the heating element is connected to the photovoltaic cells which cover light energy into electrical energy to energize the heating element.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A beverage heating device, comprising:
   a container having an interior, inner and outer surfaces, a bottom, and a perimeter side wall extending around said bottom;
   said inner surface of said container defining a reservoir adapted for holding a liquid therein;
   an elongate heating element being provided on said inner surface of said container;
   a base having a plurality of photovoltaic cells;
   said base having recess therein, said recess being adapted for receiving said bottom of said container therein; and
   said container being electrically connectable to said photovoltaic cells of said base when said container is received by said recess of said base.

2. The device of claim 1, wherein said container is generally cylindrical and said bottom of said container is generally circular.

3. The device of claim 1, wherein said heating element is located on said perimeter side wall of said container.

4. The device of claim 3, wherein said heating element is arranged in a coil extending around said perimeter side wall of said container.

5. The device of claim 1, wherein said base comprises a plurality of panels, each panel being generally rectangular and having first and second surfaces, a pair of ends and a pair of sides, each of said panels having a plurality of said photovoltaic cells being provided on said first and second surfaces of the panel.

6. The device of claim 5, wherein said panels of said base are arranged in an elongate row having first and second end panels, each panel of said base being hingedly coupled to each adjacent panel such that said panels are foldable into a stack of panels with said first end panels being positioned at one end of said stack of panels and said second end panel being positioned at another end of said stack of panels.

7. The device of claim 6, wherein said first surface of said first end panel of said base has said recess therein.

8. The device of claim 1, wherein said recess is generally circular, said base has an annular lip being extended around said recess.

9. The device of claim 1, further comprising a base contact being provided in said recess, said base contact being electrically connected to said photovoltaic cells of said base, and further comprising a container contact being provided on said outer surface of said container and positioned on said bottom of said container, said container contact being electrically coupled to said heating element of said container, said container contact being electrically connected to said base contact when said bottom of said container is received by said recess of said base.

10. The device of claim 1, further comprising a switch having an actuator provided on said outer surface of said container, said switch being electrically coupled to said heating element.

11. A beverage heating device, comprising:
   a container being generally cylindrical and having an interior, inner and outer surfaces, a bottom, and a perimeter side wall extending around said bottom, said bottom of said container being generally circular;
   said inner surface of said container defining a reservoir adapted for holding a liquid therein;
   said outer surface of said container having a handle being outwardly extended from said perimeter side wall of said container;
   an elongate heating element being provided on said inner surface of said container, said heating element being located on said perimeter side wall of said container, said heating element being arranged in a coil extending around said perimeter side wall of said container;
   a base having a plurality of panels, each panel being generally rectangular and having first and second surfaces, a pair of ends and a pair of sides, each of said panels having a plurality of photovoltaic cells being provided on said first and second surfaces of the panel;
   said panels of said base being arranged in an elongate row having first and second end panels, each panel of said base being hingedly coupled to each adjacent panel such that said panels are foldable into a stack of panels with said first end panels being positioned at one end of said stack of panels and said second end panel being positioned at another end of said stack of panels;
   said first surface of said first end panel of said base having recess therein, said recess being generally circular and being adapted for receiving said bottom of said container therein;
   said first surface of said first end panel of said base having an annular lip being extended around said recess;
   a base contact being provided in said recess, said base contact being electrically connected to said photovoltaic cells of said panels of said base;
   a container contact being provided on said outer surface of said container and positioned on said bottom of said container, said container contact being electrically coupled to said heating element of said container, said container contact being electrically connected to said base contact when said bottom of said container is received by said recess of said base; and
   a switch having an actuator provided on said outer surface of said container, said switch being electrically coupled to said heating element.

* * * * *